United States Patent [19]

Saltzman et al.

[11] Patent Number: 5,788,333

[45] Date of Patent: Aug. 4, 1998

[54] CONTROLLER FOR MECHANICAL EQUIPMENT

[75] Inventors: Mark J. Saltzman, Moreland Hills; Thomas A. Gries, Solon, both of Ohio

[73] Assignee: Buyers Products Company, Inc., Mentor, Ohio

[21] Appl. No.: 709,380

[22] Filed: Sep. 6, 1996

[51] Int. Cl.⁶ ........................................ B60P 1/04
[52] U.S. Cl. ........................... 298/19 R; 298/22 C
[58] Field of Search ........................ 298/19 R, 22 C; 74/502, 503, 527, 528, 504; 384/490; 251/93, 110

[56] References Cited

U.S. PATENT DOCUMENTS

| | | |
|---|---|---|
| 1,398,262 | 11/1921 | Gray . |
| 1,575,826 | 3/1926 | Goetz . |
| 1,986,232 | 1/1935 | Weatherhead, Jr. . |
| 1,989,961 | 2/1935 | Winning . |
| 2,126,234 | 8/1938 | Weber ........................ 74/502 |
| 2,172,294 | 6/1939 | Riddell . |
| 2,262,448 | 11/1941 | Boyce et al. . |
| 2,273,334 | 2/1942 | Shakespeare . |
| 2,805,584 | 9/1957 | Hinsey . |
| 3,107,547 | 10/1963 | Vermeulen . |
| 3,405,567 | 10/1968 | Houk . |
| 3,643,523 | 2/1972 | Mihaila . |
| 3,732,748 | 5/1973 | Cavalli . |
| 3,826,156 | 7/1974 | Dornaus ........................ 74/527 |
| 4,029,359 | 6/1977 | Glomski . |
| 4,182,534 | 1/1980 | Snyder ........................ 298/22 C |
| 4,236,757 | 12/1980 | Gregory ........................ 298/22 C |
| 4,825,909 | 5/1989 | Martin et al. ........................ 298/22 C |
| 5,305,782 | 4/1994 | Kipling et al. ........................ 298/22 C |
| 5,452,942 | 9/1995 | Brooks ........................ 298/22 C |

FOREIGN PATENT DOCUMENTS

| | | | |
|---|---|---|---|
| 57-186537 | 11/1982 | Japan . | |
| 1463554 | 3/1989 | U.S.S.R. ........................ | 298/22 C |

Primary Examiner—Karen M. Young
Assistant Examiner—Douglas Hess
Attorney, Agent, or Firm—Fay, Sharpe, Beall, Fagan, Minnich & McKee

[57] ABSTRACT

In hydraulic or mechanical systems, remote controllers are used to actuate and then control the systems. For instance, in dump vehicles, a controller controls a hydraulic or mechanical actuator that is used to raise and lower the bed during the dumping cycle. A locking safety feature is provided on such a controller to assure that accidental or too rapid of dumping does not occur. This controller provides stops that prohibit additional actuation of the bed absent override. The locking safety feature includes a button within the knob that allows for one-handed operation.

10 Claims, 5 Drawing Sheets

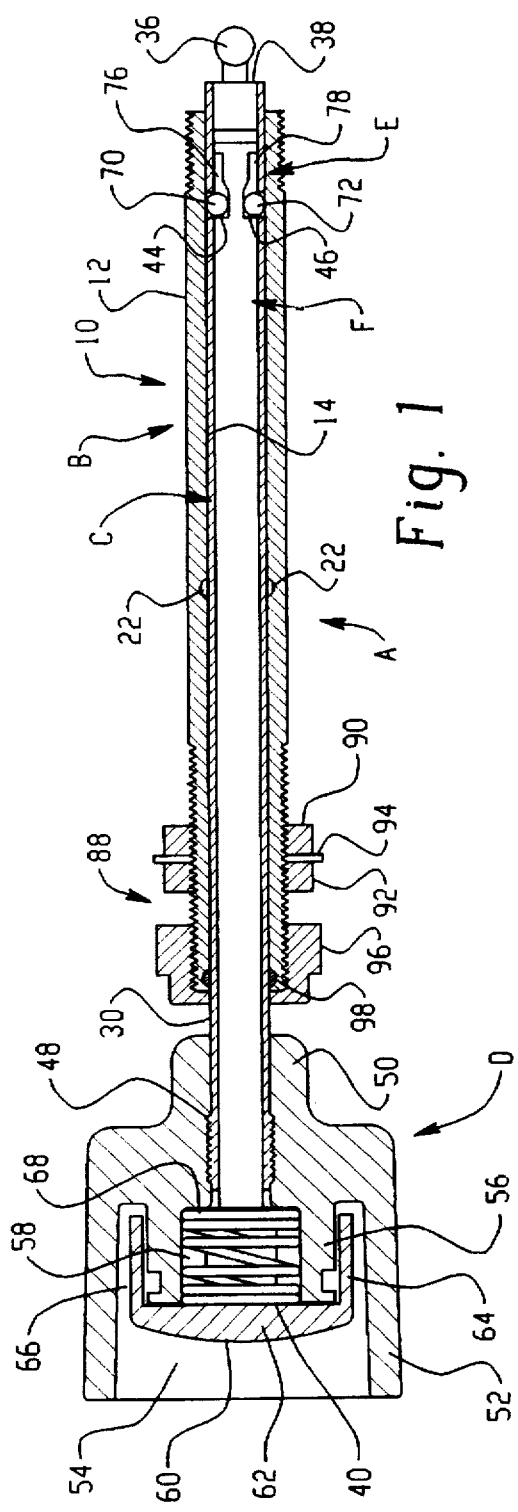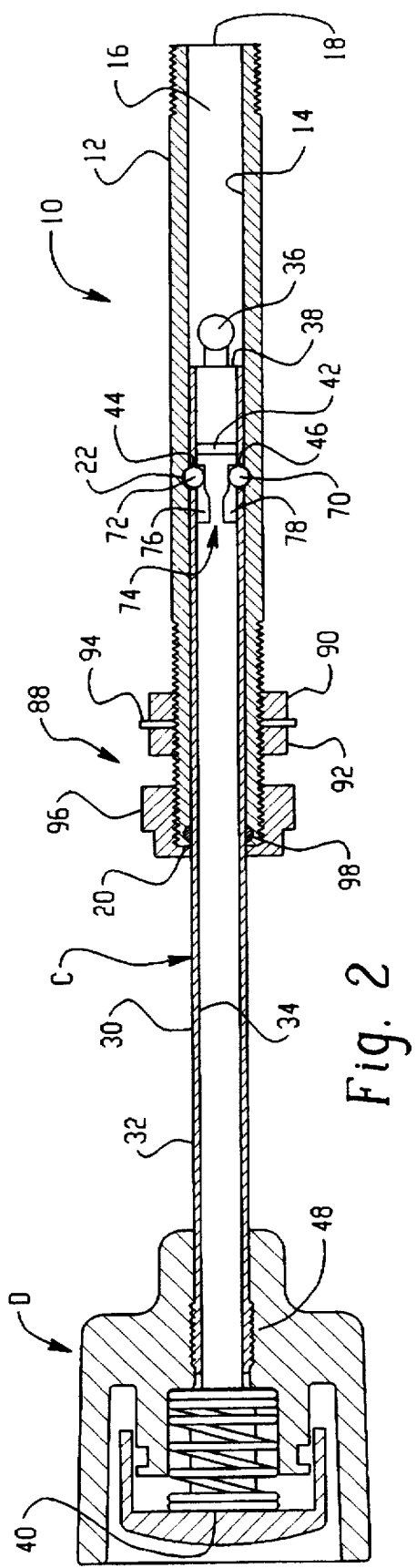

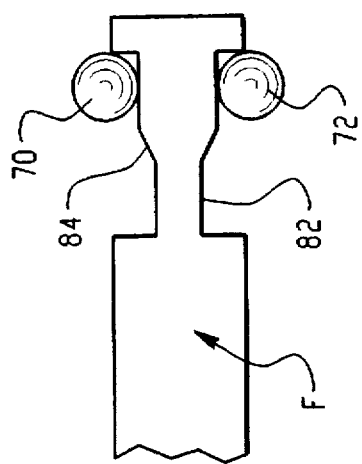
Fig. 10
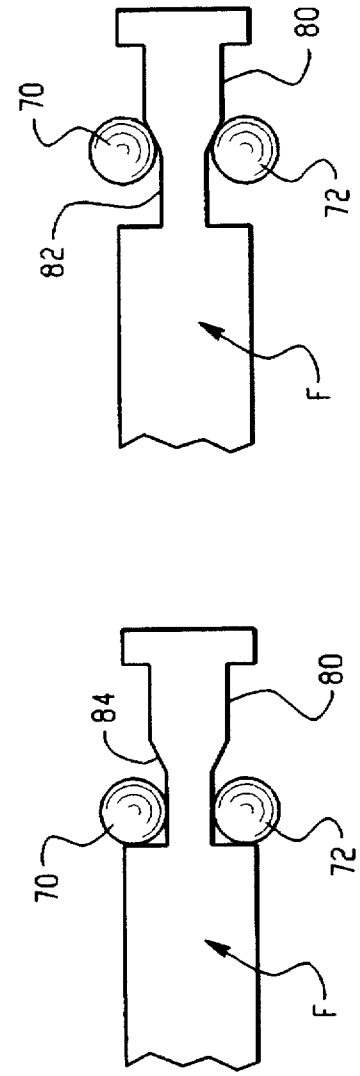
Fig. 9
Fig. 8
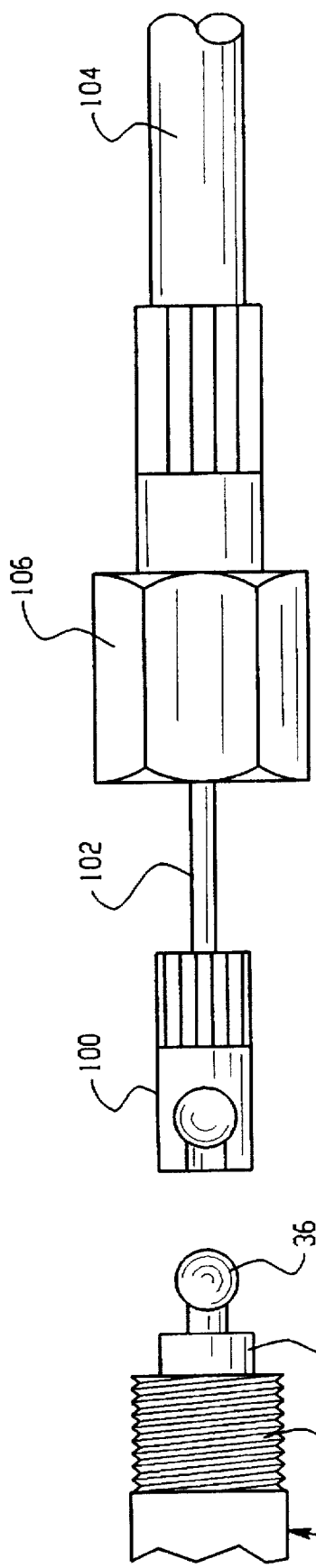
Fig. 11

CONTROLLER FOR MECHANICAL EQUIPMENT

Cross Reference to Related Applications

This application claims the benefit of U.S. Provisional patent application Ser. No. 60/011,187, filed Feb. 5, 1996.

BACKGROUND OF THE INVENTION

This invention pertains to the art of control devices and mechanisms for remote actuation and/or regulation of hydraulic, mechanical, or other motion instituting systems. In the preferred embodiment, the invention is specifically directed to a control mechanism for use in a hydraulic system in conjunction with a hydraulic cylinder that raises and lowers a load. More particularly, the invention is directed to a remote controller which releasably locks the hydraulic system it is coupled to at various preselected stages, thereby prohibiting complete actuation of the load absent release of the lock and subsequent actuation of the controller.

There are numerous applications that require remote actuation and/or control of a hydraulic or mechanical system used to raise and lower, or otherwise move, a load. One such application is a dump bed of a truck.

Prior art control mechanisms use an elongated, rigid shaft that is slidable within an elongated tube. Typically, one end of the tube is affixed near the user such as into a dashboard or control panel, and the other end of the tube extends to the hydraulic or mechanical system to be controlled and/or actuated. The shaft slidable within the tube has a handle or knob about one end that when pushed or pulled causes the rigid shaft to actuate or deactuate, or control in a variable manner the hydraulic or mechanical system.

Various locking devices have been used to selectively prohibit the shaft from sliding within the tube. This locking feature is a safety option used to prohibit the inadvertent displacement or movement of the rigid shaft or its handle due to either accidental contact with the handle or knob, vibrations from the vehicle or the loading or unloading thereof, or too hurried or rapid displacement of the rigid shaft. The result of an inadvertent or hurried displacement may be the unloading of the dump bed while the vehicle is in motion, in the wrong location, or unstably positioned. This inadvertent or hurried displacement under these conditions may create a dangerous scenario such as a tipped over vehicle.

One example of such a controller mechanism with a locking device is described in U.S. Pat. No. 4,236,757 issued to Gregory. The control mechanism is used on a hydraulic system with a hydraulic cylinder that is used to raise and lower a load in a dump bed on a vehicle. The hydraulic system is actuated for raising and lowering the dump bed upon axial displacement of a rod within a conduit. A latch within the conduit releasably locks the rod in a neutral position thereby prohibiting axial displacement of the rod from the neutral position in either axial direction. The result is the prohibition of actuation of the attached hydraulic cylinder.

Specifically, the rod includes an annular recess that is circumferentially disposed about the rod. A bore containing a locking mechanism intercepts the conduit in which the rod slides. The locking mechanism is a spring loaded moveable pin that also includes an annular recess that is circumferentially disposed about the pin. The spring biases the pin such that the annual recess in the pin is not adjacent the inter-section area of the bore and the conduit. Depression of cap moves the annular recess into an adjacent position whereby the rod is slidable causing the annular recess in the rod to move out of its position adjacent the pin. The result is the rod moves axially within the conduit thereby actuating or deactuating the hydraulic system the rod is attached to.

Unfortunately, this system is difficult to use in that it frequently requires two hands to unlock the pin while simultaneously sliding the rod within the conduit. Specifically, one hand engages the control knob for the purpose of sliding the rod within the conduit, while the second hand depresses the cap of the spring loaded pin. Basically, one hand is used to pull the cable while the second hand is used to disengage the lock.

The two hand requirement has resulted in the users of this controller mechanism tampering with, disabling and/or in some instances, removing the locking mechanism. When this occurs, a dangerous condition is created due to the ease in which the load could accidentally be dumped at the wrong time or in the wrong place, including during movement of the vehicle of where a person is under the bed. This accidental dumping may occur due to accidental or inadvertent bumping the handle, or due to typical vibrations that occur during vehicle use.

Accordingly, a controller mechanism, particularly for power equipment hydraulic or mechanism system actuation, having the following characteristics is desired:

(1) Where the system releasably locks the hydraulic or mechanical mechanism in a neutral, non-actuated position, and/or at various preselected intervals during actuation, (2) Where the lock prevents inadvertent or accidental displacement of the rod within the conduit, (3) Where the release or disengagement of the lock requires precise and definite actuation, (4) Where the release or disengagement of the lock is easy to perform using only one hand, and (5) Where the ability to tamper with, disengage, or remove the lock is difficult. These and other objects and features of the invention will be apparent from the following summary and description of the invention, figures and from the claims.

SUMMARY OF THE INVENTION

The present invention provides a controller mechanism adapted for mounting on an instrument panel, control panel or dashboard of a motor vehicle, construction equipment or other machinery where the controller mechanism is typically remote from the hydraulic or mechanical system to be controlled and/or actuated. The present invention also provides a locking feature that is easy to use yet secure from inadvertent or accidental displacement caused by bumping, vibrations, or other accidental contact. The control device of the invention is easy to manipulate, economical in construction and safe in operation.

Generally, the present invention is a controller mechanism having a pair of rigid tubes and a locking mechanism comprising a locking rod and ball bearings. Specifically, the controller mechanism has a first rigid tube with an inner cylindrical surface including at least one circumferential groove therein. In addition, the controller mechanism has a second rigid tube with a knob rigidly affixed to one end thereof and defining a pair of apertures therein. The second rigid tube is slidable within the first rigid tube. The knob is affixed to a rod slidable within the second rigid tube. The rod has a circumferential cutout defining a shallow and a deep section. Also, the controller mechanism includes a pair of balls positionable within the circumferential cutout and selectively alignable with the pair of apertures.

BRIEF DESCRIPTION OF DRAWINGS

The invention may take physical form in certain parts and arrangements of parts, preferred embodiments of which will be described in detail in this specification and illustrated in the accompanying drawings. The following is a brief description of the drawings which are presented for the purposes of illustrating the invention and not for the purposes of limiting the same.

FIG. 1 is a side sectional view of a first embodiment of a controller or activator for equipment where the controller is in an unlocked or slidable position;

FIG. 2 is a side sectional view of the controller in FIG. 1 in a locked or unslidable position;

FIG. 8 is a detailed view of the locking rod within the locking mechanism when in an unlocked position as shown in FIG. 6;

FIG. 9 is a detailed view of the same locking rod of FIG. 8 as the locking mechanism is beginning to engage;

FIG. 10 is a detailed view of the locking mechanism after engagement into a locking position as is shown in FIG. 7;

FIG. 11 is a partially exploded view of the controller mechanism as attached to a cable and cable sheet;

DETAILED DESCRIPTION OF THE PREFERRED EMBODIMENTS

Further scope of the applicability of the present invention will become apparent from the detailed description given hereinafter. It should, however, be understood that the detailed description of specific examples, while indicating preferred embodiments of the invention, are given by way of illustration only, since various changes and modifications within the spirit and scope of the invention will become apparent to those skilled in the art.

Figure 3:
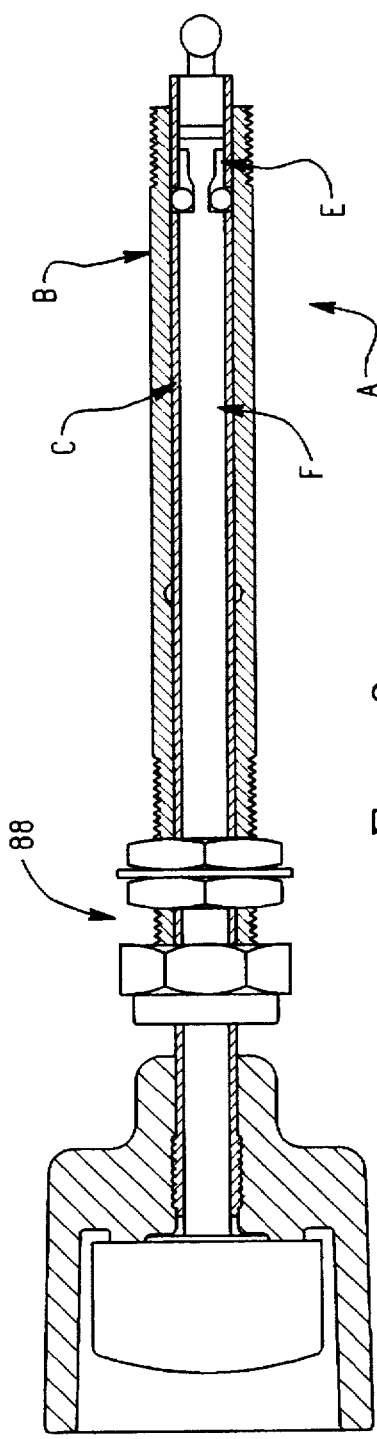
FIG. 3 is a partial side sectional view of the controller of FIG. 1.
Figure 4:
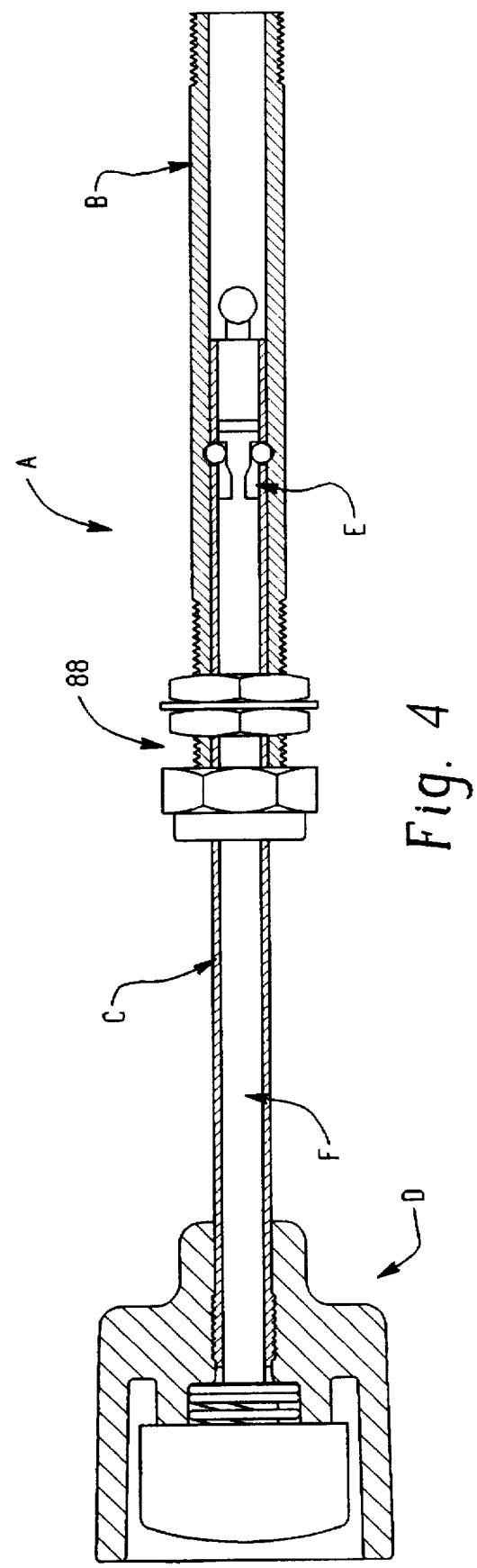
FIG. 4 is a partial side sectional view of the controller of FIG. 2.

Referring now to the drawings wherein the showings are for the purposes of illustrating the preferred embodiments of the invention only and not for purposes of limiting same. FIGS. 1–4 show a controller mechanism, A, and more particularly a controller mechanism having a tubular support member B with a tubular actuation member C slidable supported therein.

As shown in FIGS. 1–4, the tubular support member B is a first elongated tube 10 that has an outer cylindrical surface 12 and a smooth non-threaded inner cylindrical surface 14. The inner cylindrical surface 14 defines an axial chamber 16 extending from a first open end 18 to a second open end 20. The inner cylindrical surface 14 of the tube 10 has one or more circumferential or partially circumferential depressions, channels or grooves 22 therein between the first and second ends 18 and 20. The first and second ends 18 and 20 are externally threaded. The tubular support member 10 is preferably rigid in structure.

The tubular actuating member C, as shown in FIGS. 1–4, is a second elongated tube 30 that has an outer cylindrical surface 32 and an inner cylindrical surface 34, and is of a smaller diameter than the first elongated tube 10 so as to be slidable within the first tube 10. The second tube 30 has a coupler ball 36 affixed to a first or inward end 38 and a finger grip, handle or knob D affixed to a second or outward end 40. The second tube 30 has an interior chamber 42 extending from the knob D to substantially the first end 38. The second tube 30 includes one or more openings or holes 44 and 46 extending outward through the chamber walls defining a passageway from the interior chamber 38 to the outer cylindrical surface 32. In one embodiment, the second end 40 of the second tube 30 has a plurality of annular ridges or grooves 48 for strengthening the bond between the molded knob D and the second tube 30.

Plunger F is slidable and rotatable within interior chamber 42 of tubular activating member C. Plunger F has one or more cutouts as described below with reference to a locking mechanism E for restricting the otherwise free sliding motion of the plunger F within the chamber 42.

Figure 5:
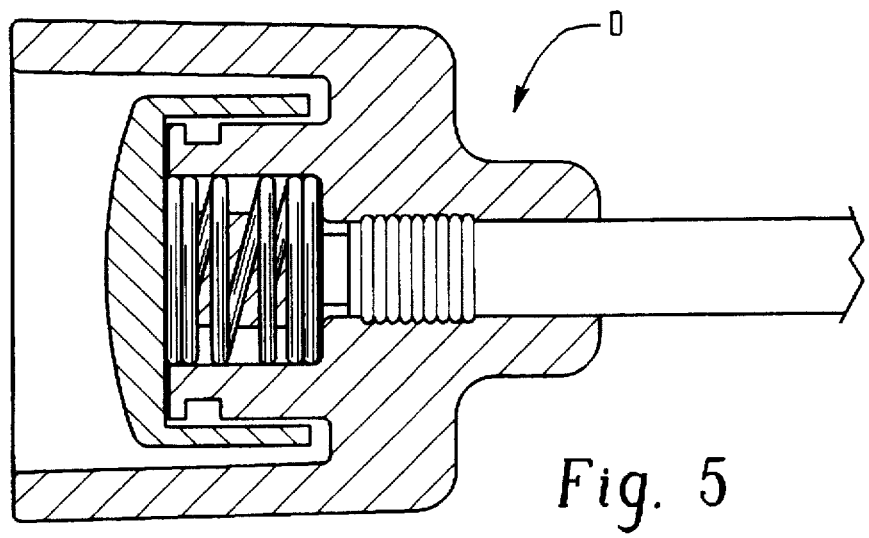
FIG. 5 is an enlarged side sectional view of the knob of the controller of FIG. 1.

Knob D, as shown in FIGS. 1–5, is affixed to the second end 40 of the second tube 30 such that pushing or pulling of the knob results in movement of the second tube 30 within the first tube 10. Preferably, knob D is a polymer molded to include a base portion 50 having a finger grip area, an outwardly extending tubular wall 52 extending therefrom and defining a chamber 54 therein, and a button stop portion 56 defining a spring chamber 58 therein. The knob is molded to the plurality of annular ridges or grooves 48 on the second tube 30.

In an alternative embodiment, the knob is assembled from several pieces including base 50 having a button stop 56 therein, and tubular wall 52. In either embodiment, knob D also includes a button 60 having a base 62 with an outwardly extending tubular wall 64 defining a chamber 66 for receiving the button stop portion 56. A spring 68 is positioned within spring chamber 58 and compressed between base portion 50 of the knob D and base 62 of the button 60.

Figure 6:
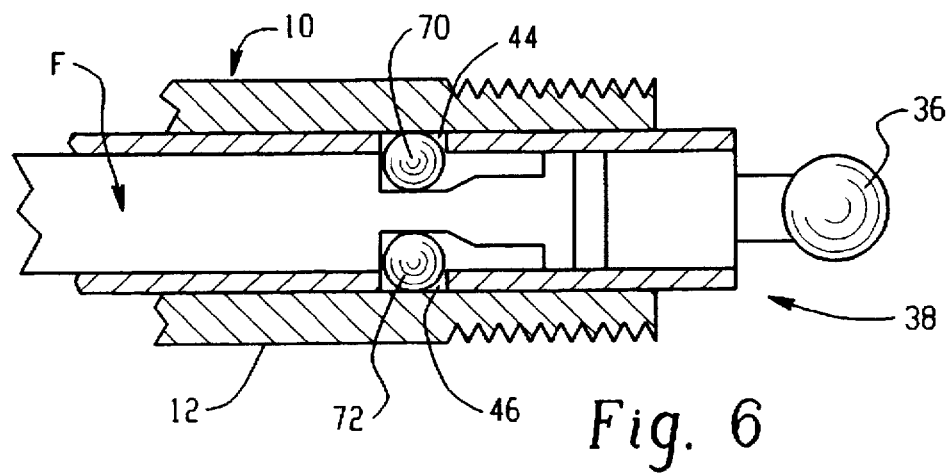
FIG. 6 is an enlarged sectional view of the locking mechanism of the controller as shown in FIG. 1 in an unlocked or slidable position.
Figure 7:
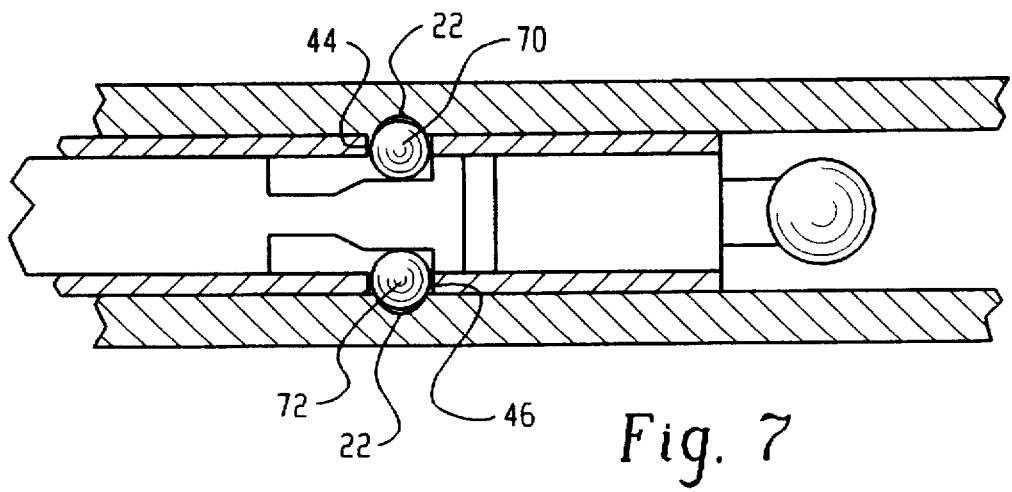
FIG. 7 is an enlarged view of the locking mechanism as shown in FIG. 2 in a locked or unslidable position.

Locking mechanism E, as more clearly shown in FIGS. 6–10, is a pair of ball bearings 70 and 72 alignable in and used in conjunction with a cutout 74 in plunger F positioned towards the end opposite the knob D. The pair of ball bearings 70 and 72 are selectively alignable with holes 44 and 46, respectively. The plunger F extends from and is typically affixed to base 62 of button 60. Spring 68 surrounds the knob-end of the rod F and biases the rod toward the knob.

The cutout 74 is a pair of gaps 76 and 78 in the plunger F. Each gap 76 or 78 has a shallow section 80 and a deep section 82 with a sloped section 84 therebetween. Alternatively, the cutout 74 is a narrowed neck defined as an area of smaller diameters than the plunger F, that is, it includes a circumferential shallow and deep sections 80 and 82 with a circumferential sloped section 84 therebetween all of which are of a lesser diameter than plunger F.

The controller mechanism A is typically affixed in a dashboard or other instrument panel 88, as shown in FIGS. 1–4, by inserting the first threaded end 18 of the first tube 10 through a hole in the dashboard and securing it there using a pair of panel nuts 90 and 92, as shown in FIGS. 1–4. At least one washer 94 may also be used. A face nut 96 is threaded over the first threaded end 18 such that it compresses an o-ring 98 between the nut 96 and the end 18 for preventing lubricant leakage.

The function and general assembly of the connector mechanism is as follows. the knob D is molded to or otherwise connected to the second end 40 of the second tube 30. The plunger F is slid into the interior chamber 42 of the second tube 30. Spring 68 is slid over plunger F and seated within spring chamber 58. Button 60 is positioned over the spring 68. The button is affixed over button stop portion 56 such that spring 68 is compressed between base portion 50 of the knob D and base 62 of the button 60. The result is the spring 68 biases the button 60 away from base portion 50 in knob D.

Alternately, button 60 may be affixed over button stop portion 56 in any of a number of known ways as long as the button is depressible in relation to the button stop. In the preferred embodiment, the button 60 includes a circumferential lip in chamber 66 that snap fits onto a circumferential groove in button stop portion 56 where the groove is wider than the lip. This loose fit in combination with spring 68 results in the button 60 being biased away from the base 62 of the knob D while allowing the button 60 to be depressible over the button stop portion 56 until the button 60 engages the base 62. This depressing of the button further compresses spring 68 thereby sliding locking rod F.

The pair of holes 44 and 46 are aligned with the pair of gaps 76 and 78. The pair of ball bearings 70 and 72 are inserted into the pair of holes 44 and 46, respectively. The ball bearings cannot be fully inserted into the holes and gaps because the spring 68 is biasing the button 60 away from the base 62 of the knob D resulting in the alignment of the shallow section 80 of each gap 76 and 78 with the holes 44 and 46. When the shallow section 80 of each gap 76 and 78 is aligned with the holes 44 and 46, the ball bearings 70 and 72 will only partially seat within the holes 44 and 46, and the gaps 76 and 78, respectively.

The depressing of the button 60 further compresses the spring 68 causing the plunger F to slide in the second tube 30. The ball bearings 70 and 72 cannot move axially with the plunger or locking rod F because each ball extends partly into holes 44 and 46, therefore, the ball bearings slide down the sloped section 84 to the deep section 82.

Basically, when the second tube 30 is slid further within the first tube 10 by depressing button 60, the ball bearings 70 and 72 move down the sloped section 84 of each gap 76 and 78 to the deep section 82 of each gap 76 and 78. The result of this ball movement is that the ball bearings 70 and 72 will fully seat within the holes 44 and 46, and the gaps 76 and 78, respectively, thereby fitting fully within the second tube 30 and not inhibiting or blocking sliding of the second tube 30 within the first tube 10.

After the ball bearings 70 and 72 are moved to this fully seated position by depressing button 60, the second tube 30 is then slidably positioned within the axial chamber 16 of the first tube 10 via second threaded end 20 of the first tube 10.

When the second tube 30 is fully inserted into the first open end 18 such that the knob D is adjacent the first open end 18, the coupler ball 36 extends out of the second open end 20. This coupler ball 36 is then affixed to a coupler link 100 that is attached to a flexible cable 102 slidable within a cable sheath or housing 104. The other end of the flexible cable is fastened to the hydraulic or mechanical mechanism to be actuated or controlled. This type of transmission is well understood in the art and thus will not be particularly described. A coupler nut 106 on the end of cable sheath 104 is threaded to the second threaded end 20 of the first tube 10 thereby securing the coupler ball 36 within the sheath 104 and the first tube 10. Generally, assembly is now complete.

The mechanism functions as follows, as the second tube 30 slides within the first tube 10 the ball bearings 70 and 72 remain in the fully seated position due to the contact of the ball bearings with the inner cylindrical surface 14 of the first tube 10. This full seating of the ball bearings continues until one of the annular or circumferential grooves 22 is encountered. The result is that the ball bearings 70 and 72 unseat due to the absence of an outside surface and the bias on the plunger or locking rod F to axially shift within the second tube 30. Specifically, the ball bearings 70 and 72 are no longer in contact with the inner cylindrical surface 14 of the first tube 10 thereby allowing the ball bearings 70 and 72 to simultaneously move outward in holes 44 and 46 into groove 22 while rolling or sliding up the sloped section 84 from the deep section 82 to the shallow section 80.

The second tube 30 is prohibited from axial motion as long as these ball bearings 70 and 72 engage the groove 22. spring 68 acts to push button 60 away from knob D resulting in plunger or locking rod F being pulled as far out of second tube 30 as possible thereby working to keep the ball bearings 70 and 72 outward in the groove 22 and along this shallow section 80.

To disengage or release the second tube 30 from its locked position in reference to the first tube 10, button 60 is depressed thereby further compressing spring 68 causing the locking rod F to slide inward into the second tube 30. The ball bearings 70 and 72 cannot axially move with the locking rod because each ball extends partly into holes 44 and 46, therefore, the ball bearings slide down the sloped section 84 to the deep section 82. The result is the second tube 30 is again free to slide within the first tube 10 until another annular groove 22 is encountered.

In operation, at least one annular groove 22 is machined in the inner cylindrical surface 14 at a preselected critical position. When the operator desires to actuate the hydraulic or mechanical system, i.e., such as to dump a load from a dump vehicle, the operator pulls with one hand the knob D from its fully inserted position thereby pulling flexible cable 102. The pulling of the knob D pulls the second tube 30 out of the first tube 10 thereby actuating the hydraulic or mechanical system, e.g., raising the dump bed on the dump truck such that dumping of the load begins.

Knob D is pulled out until an annular groove 22 is encountered where the ball bearings 70 and 72 pop outward into the groove 22 thereby locking the knob D from further inward or outward motion. Typically, the selection of this point for the annular groove 22 is either when the knob is fully inserted or at some point after pulling has begun but prior to substantial actuation of the hydraulic or mechanical system thereby prohibiting accidental or too rapid actuation. Additional grooves may be supplied at other critical points. This locking stops the actuation, e.g., the dumping is stopped or placed on hold.

The operator must then depress the button 60 with one hand to release the ball bearings to allow for further pulling of the knob D. As mentioned, the entire pulling and depressing motion is accomplished with one hand. Typically, the shaft of the controller mechanism containing the tubes 10 and 30 and the rod F is held by the fingers such that the shaft fits in between two fingers. Any pulling of that hand results in base portion 50 seating against the hand. The hand is thus properly positioned such that the thumb is wrapped around the knob D in a manner allowing for easy depressing of the button 60.

In addition, the controller mechanism A of the present invention allows for rapid deactivation of the hydraulic or mechanical mechanism being actuated. This is particularly useful in emergency situations such as the over-extension of a lift bed.

When rapid deactivation is desired, the operator can quickly reverse activation by pushing shaft C into conduit B with the palm of the operator's hand. In essence, the palm of the operator's hand would engage the outwardly extending tubular wall 52 of knob D thereby forcing shaft C into conduit B. Shaft C would move inwardly into conduit B until the ball bearing of shaft C encounters one of the annular or circumferential grooves of 22. Preferably, the annular or circumferential grooves 21 would be positioned in the shaft at a neutral position.

Further deactivation can occur by pushing inwardly on push button 60, and thereby unseating the ball bearing from the annular groove 22. Shaft C can then be moved further inwardly into conduit B until additional annular grooves are encountered or until full deactivation occurs.

Moreover, outwardly extending tubular wall 52 of knob D also protects push button 60 from accidental or inadvertent actuation. In this regard, tubular wall 52 acts as a barrier for inhibiting accidental latch engagement of push button 60.

The invention has been described with reference to the preferred embodiments. Obviously, modifications will occur to others upon a reading and understanding of this specification and this invention is intended to include same insofar as they come within the scope of the appended claims or the equivalents thereof.

Having thus described the invention, it is now claimed:

1. An equipment controller comprising:

a first tubular member having a stop positioned on a smooth non-threaded inner cylindrical surface thereof;

a second tubular member slidably received within the first tubular member and having at least one aperture extending through a side wall thereof;

a rod slidably received within the second tubular member and having at least one contoured recess axially aligned with the at least one aperture;

a spring means providing an axial biasing force between the rod and the second tubular member; and a locking member positionable within the contoured recess, the contoured recess urging the locking member radially outward in response to the axial biasing force such that the rod is selectively carried with the second tube member, the stop being axially positioned at a predetermined location along the inner cylindrical surface whereby the equipment is no more than partially actuated when the locking member engages the stop.

2. The controller of claim 1, wherein the locking member is urged through the aperture and into engagement with the stop when the aperture and the stop are axially aligned.

3. The controller of claim 1, wherein the stop includes an annular groove extending around the inner cylindrical surface of the first tubular member.

4. The controller of claim 1, wherein the stop includes a plurality of axially spaced annular grooves extending around the inner cylindrical surface of the first tubular member.

5. The controller of claim 1, wherein the locking member includes a ball bearing.

6. The controller of claim 1, further including a knob secured to a proximal end of the second tubular member for slidably positioning the second tubular member relative to the first tubular member; and a button secured to a proximal end of the rod and being surrounded by the knob, the spring means biasing the button relative to the knob.

7. The controller of claim 1, wherein the second tubular member has a plurality of circumferentially spaced apertures through a side wall thereof, and the rod has a plurality of circumferentially spaced contoured recesses which are mutually aligned with the plurality of circumferentially spaced apertures, and a locking member is positionable within each of the contoured recesses, the contoured recesses urging the respective locking members radially outward in response to the axial biasing force.

8. The controller of claim 1, wherein the at least one contoured recess includes a radially inner portion, a radially outer portion and a sloped portion extending between the radially inner and radially outer portions, and the radially inner, the radially outer and the sloped portions each having a diameter less than a diameter of the rod.

9. The controller of claim 1, further including a control cable having one end connected to the equipment and another end connected to the rod, the stop being axially positioned along the inner cylindrical surface whereby the equipment is not actuated when the locking member engages the stop.

10. A method of actuating a motion instituting system with a controller including a first tubular member having a stop positioned on a smooth inner cylindrical surface thereof, a second tubular member slidably received within the first tubular member and having at least one aperture extending through a side wall thereof, a rod slidably received within the second tubular member and having at least one contoured recess axially aligned with the at least one aperture, a spring means providing an axial biasing force between the rod and the second tubular member, and a locking member positionable within the contoured recess, the contoured recess urging the locking member radially outward in response to the axial biasing force such that the rod is selectively carried with the second tube member, a control cable being secured at one end thereof to the motion instituting system and secured at the other end thereof to the rod, the method comprising:

(a) axially moving the second tube member and the rod relative to the first tube member in a first direction until the aperture is axially aligned with the stop whereby the locking member is urged into engagement with the stop to prevent further axial movement of the second tube member and rod, the control cable being repositioned to no more than partially actuate the motion instituting system;

(b) then, axially moving the rod relative to the second tube member against the biasing force to disengage the locking member from the stop; and (c) then, axially moving the second tube member and the rod relative to the first tube member in the first direction whereby the control cable is further positioned so as to fully actuate the motion instituting system.

* * * * *

UNITED STATES PATENT AND TRADEMARK OFFICE
CERTIFICATE OF CORRECTION

PATENT NO. : 5,788,333

DATED : 8/4/98

INVENTOR(S) : Saltzman et al.

Figure 12:
FIG. 12 is a side elevation of one embodiment of the controller mechanism.
Figure 13:
FIG. 13 is a side elevational view of a second embodiment of the controller mechanism A.
Figure 14:
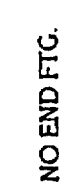
FIG. 14 is a side elevation of another controller mechanism embodiment with no end fitting.
Figure 15:
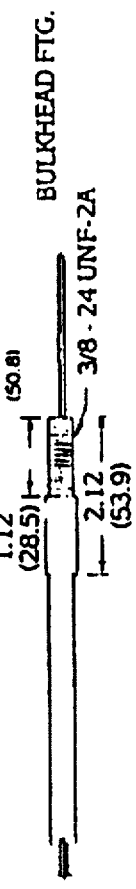
FIG. 15 is a side elevation view of an even further embodiment of a controller mechanism with a bulkhead fitting.
Figure 16:
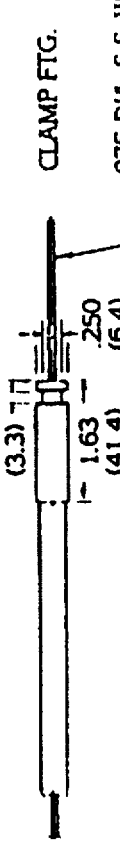
FIG. 16 is a side elevation view of an additional embodiment of the controller mechanism with a clamp fitting.
Figure 17:
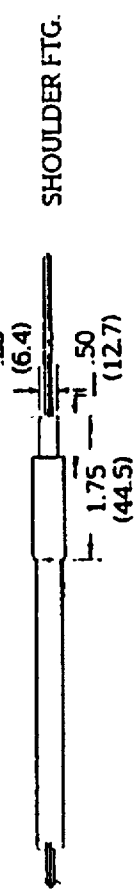
FIG. 17 is a side elevation view of an even further additional embodiment with a shoulder fitting.
Figure 18:
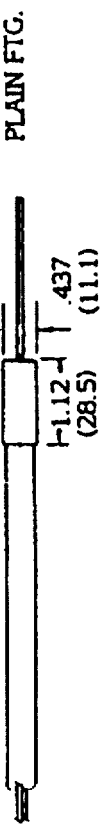
FIG. 18 is a side elevation view of one more embodiment of a controller mechanism with a plane fitting.

It is certified that error appears in the above-identified patent and that said Letters Patent is hereby corrected as shown below:

Drawings:

Please delete Figures 12-18

Column 3, line 38, after ";", add --and--.

Column 3, line 40, replace ";" with --.--.

Column 3, delete lines 41-56

Signed and Sealed this

Sixth Day of April, 1999

Attest:

Q. TODD DICKINSON

Attesting Officer

Acting Commissioner of Patents and Trademarks